April 25, 1961

F. G. BUHRENDORF 2,981,936

MAGNETIC DATA STORAGE MEDIUM

Filed July 18, 1957

3 Sheets-Sheet 1

INVENTOR
BY F. G. BUHRENDORF
Kenneth B. Hamlin
ATTORNEY

April 25, 1961 F. G. BUHRENDORF 2,981,936

MAGNETIC DATA STORAGE MEDIUM

Filed July 18, 1957 3 Sheets-Sheet 2

INVENTOR
F. G. BUHRENDORF
BY Kenneth B. Hamlin
ATTORNEY

April 25, 1961 F. G. BUHRENDORF 2,981,936

MAGNETIC DATA STORAGE MEDIUM

Filed July 18, 1957

3 Sheets-Sheet 3

INVENTOR
F. G. BUHRENDORF
BY Kenneth B. Hamlin
ATTORNEY

United States Patent Office 2,981,936

Patented Apr. 25, 1961

2,981,936

MAGNETIC DATA STORAGE MEDIUM

Frederick G. Buhrendorf, Westfield, N.J., assignor to Bell Telephone Laboratories, Incorporated, New York, N.Y., a corporation of New York Filed July 18, 1957, Ser. No. 672,685

14 Claims. (Cl. 340—174.1)

This invention relates to data storage systems and more particularly to such systems employing magnetic data storage media.

Magnetic data storage media such as magnetic tapes and magnetic drums are well known in the art. In general, these media comprise a movable surface of magnetizable material and a plurality of magnetic pickup heads in fixed physical relationship thereto. The magnetic drum, for example, ordinarily takes the form of a cylinder having a magnetizable surface and arranged for rotation around its axis, although the drum may comprise an endless magnetic belt or disc. Arranged around the drum and in fixed physical relationship thereto are a plurality of magnetic reading and writing heads by means of which information may be written onto or read from the magnetic surface of the drum. Generally these heads have associated therewith amplifiers to which control and synchronizing pulses may be applied at the instant a desired information bit is present under a particular head.

Certain terms have become generally accepted in discussing magnetic drums and magnetic tapes and for convenience these terms are set forth at this point. A cell is that unit area of the movable magnetizable surface in which a bit of information is stored; accordingly, any one individual magnetic head is effective upon only the one cell directly under the head at any instant. The aggregate of all the cells which pass under a particular magnetic head is referred to as a track, while the aggregate of cells in different tracks simultaneously under a specified group of heads is referred to as a slot.

One disadvantage of systems employing magnetic storage media and particularly of systems employing magnetic drums resides in the access time required to read or write a particular bit of information. As each cell in a single track passes successively under a magnetic head, access to information in any cell cannot be had on a random basis but only by waiting for the movement of the magnetic surface to bring that cell again under a magnetic head. In magnetic drums, for example, the average access time will be one half the time for a single revolution of the drum. Although drums may rotate at high speeds, the necessity to design for a maximum possible access time waiting period of substantially the time of one rotation of the drum has proven to be a drawback.

Priorly it has been suggested to reduce the access time to a single bit of information stored in a movable magnetic storage medium by employing a number of magnetic heads around each track and by providing information in other tracks to identify the magnetic head closest in movement to where the information bit is at any given instant. This magnetic head next in advance of the information cell is then the one that is enabled. However, it is readily apparent that such systems tend to be cumbersome and to require an excessive amount of additional control circuitry.

It is a general object of this invention to provide an improved magnetic data storage system.

It is a more specific object of this invention to reduce the access time required for access to information stored in a movable magnetic data storage medium.

These and other objects of this invention are attained in one specific embodiment wherein information is stored in a small number of tracks in accordance with a combinatorial code and a plurality of magnetic heads are positioned adjacent those tracks for simultaneously reading out the information in the cells under those heads at a given instant. Priorly when it has been desired to store a number in a binary code requiring, let us say, eight bits, that number has been stored in a single slot comprising eight cells in eight different tracks. Further, in conventional binary codes the order of 0's and 1's, i.e., of the two possible states of magnetization, in the code has been determinative of the value of that code.

In accordance with my invention, however, information is stored in a number of cells of a single track, and this information is stored in a combinatorial code wherein the total number of 0's and 1's in the information read out, rather than the specific order of these binary bits, is what is determinative of the number or information stored. For example, conventionally the code representation 01100101 has required eight tracks and has had a definite numerical value which is distinct from that of the representation 10010101; in embodiments of my invention, however, wherein combinatorial codes are employed these two representations are afforded the same numerical value. Further, in embodiments of my invention these bits may be stored in eight cells arranged in two or even in only one track.

It is an aspect of my invention that since it is only the total number of 0's and 1's in the code that is determinative of its value, the information may be read out, or recorded, each time any of the cells in a single track is under any of the reading heads. Accordingly, if four cells in one track and four cells in another track are utilized for storage of one number on the surface of a magnetic drum, for example, and each track has four equally spaced heads around its periphery, access may be had to that information not once but four times during each revolution of the drum. Further, if the eight cells are positioned in a single track, with eight equally spaced heads around its periphery, then access may be had eight times during each revolution of the drum.

Accordingly, because I employ combinatorial, rather than permutation or positional, codes, the particular head adjacent a track which reads a cell in that track may be found entirely at random without regard to which of the information bits pertinent to that number in that track is contained in that cell.

It is a feature of my invention that information pertaining to a single number or code be stored in a number of cells of a single track on a movable magnetic storage medium and read out simultaneously by a plurality of magnetic heads adjacent that track of the medium.

It is a further feature of this invention that information be stored in cells common to one or more tracks of a movable magnetic storage medium in a combinatorial code.

It is another feature of my invention that the combinatorial code read from the cells simultaneously under the magnetic heads be translated into a conventional permutation code, such as a bi-quinary code.

A complete understanding of these and various other features of my invention may be gained from consideration of the following detailed description, together with the accompanying drawing, in which.

Figure 1:
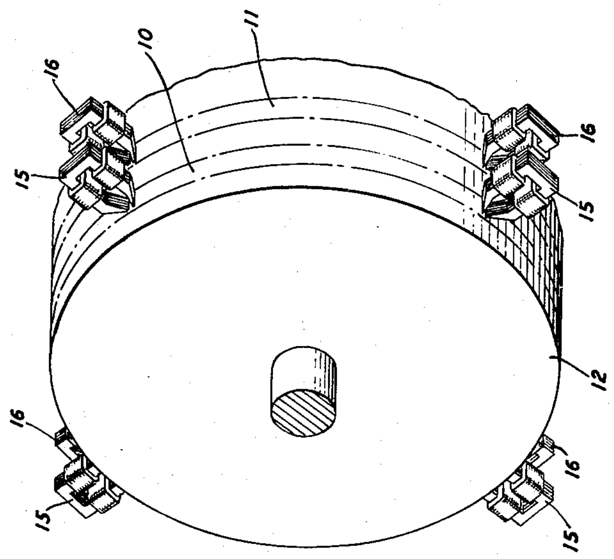
Fig. 1 is a perspective view of a portion of a magnetic drum illustrative of one specific embodiment of my invention.
Figure 2:
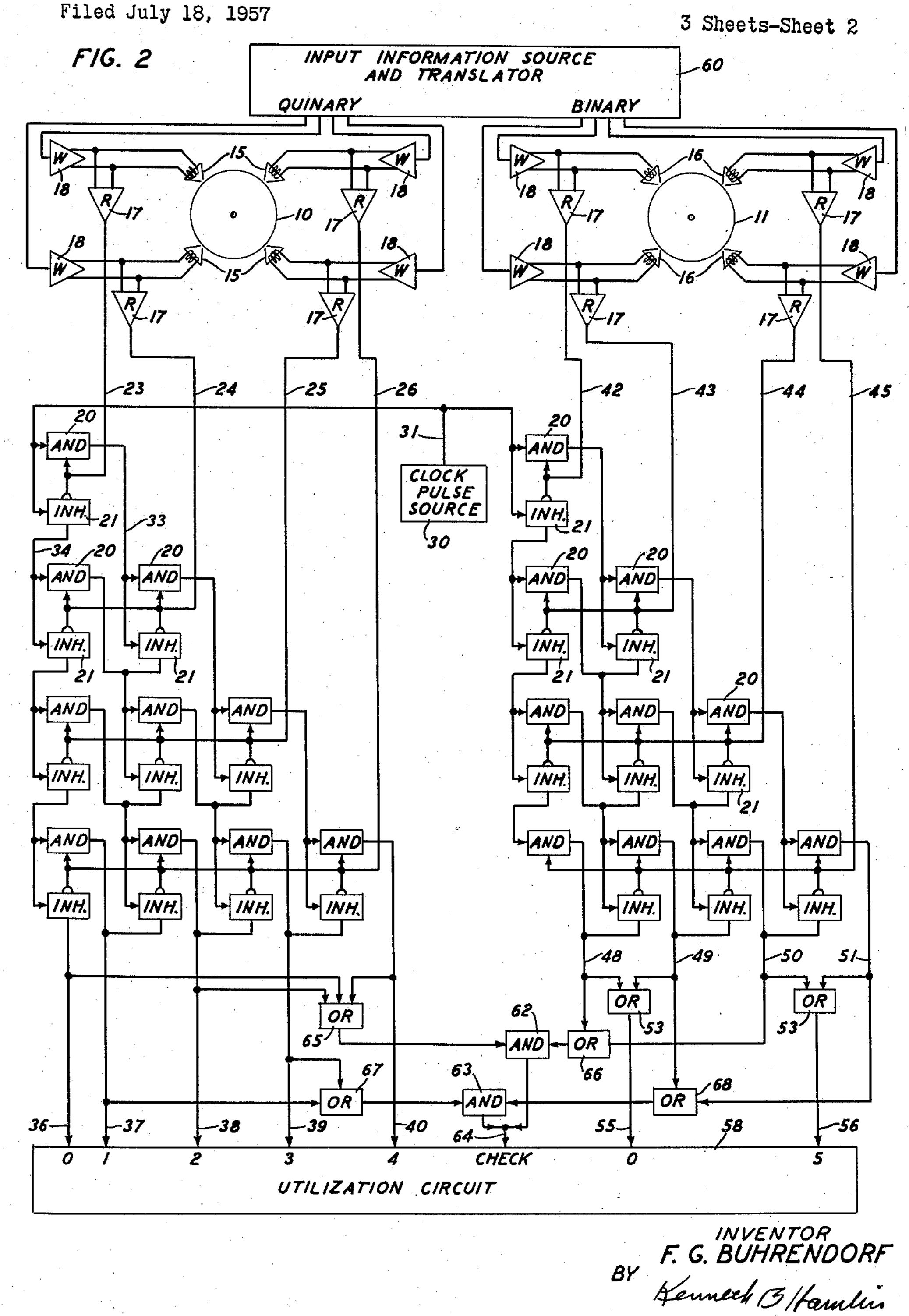
Fig. 2 is a schematic representation of one illustrative embodiment of a data storage system in accordance with my invention utilizing the two magnetic tracks of the drum of Fig. 1.

Turning now to the drawing, Figs. 1 and 2 depict one illustrative embodiment of my invention wherein two tracks 10 and 11 on a magnetic drum 12 are utilized for the storage of information in a decimal digit code composed of binary units in combination, rather than in permutation. As clearly seen in Fig. 1, four magnetic heads 15 are equally spaced around the periphery of track 10 of magnetic drum 12, and four magnetic heads 16 are similarly equally spaced around the periphery of track 11. In this specific embodiment the ten decimal digits are obtained by a combinatorial bi-quinary code; the quinary portion of that code is stored in discrete cells in track 10 and the binary in discrete cells in track 11.

As seen in Fig. 2, wherein for purposes of illustration, the two channels have been depicted separated from each other, appropriate reading and writing amplifiers 17 and 18, respectively, are associated with each head. The reading and writing amplifiers may be of any of the types known in the art and specifically may be as disclosed in Patent 2,700,148, issued January 18, 1955, of J. H. McGuigan, O. J. Murphy, and N. D. Newby; or application Serial No. 307,108, filed August 29, 1952, of W. A. Cornell, J. H. McGuigan, and O. J. Murphy, now Patent 2,845,610, issued July 29, 1958. Similarly, timing or synchronizing pulses, which may advantageously be derived from a single track on the magnetic drum 12, may also be applied to the amplifiers to control their operation in proper time sequence. Such timing arrangements are similarly well known in the art and are fully disclosed, inter alia, in W. A. Malthaner-H. E. Vaughan Patent 2,723,311, issued November 8, 1955.

In accordance with this specific embodiment of my invention, information may be stored in a bi-quinary code in which each digit is dependent not on the specific permutation of binary bits stored in the four cells simultaneously under the magnetic heads for each track, but rather on the combination of such binary bits, that is, the total number of similarly magnetized cells simultaneously under the heads 15 and 16, regardless of which particular cells are thus magnetized or which particular heads sense that state of magnetization. It may be noted that while in Fig. 1 the heads 16 have been indicated as positioned directly adjacent to heads 15, this is not essential and the heads 16 may be offset from the heads 15 provided that the heads are equally spaced around their respective tracks.

The specific bi-quinary code employed in this embodiment of my invention is indicated in the following table:

*Table I*

| Decimal Digit | Bi-Quinary Code | | Check Sum |
|---|---|---|---|
| | Binary | Quinary | |
| 0 | 0001 | 0000 | 1 |
| 1 | 0011 | 0001 | 3 |
| 2 | 0001 | 0011 | 3 |
| 3 | 0011 | 0111 | 5 |
| 4 | 0001 | 1111 | 5 |
| 5 | 0111 | 0000 | 3 |
| 6 | 1111 | 0001 | 5 |
| 7 | 0111 | 0011 | 5 |
| 8 | 1111 | 0111 | 7 |
| 9 | 0111 | 1111 | 7 |

In the above table a "1" represents one state of magnetization of the surface of the magnetic drum and a "0" the opposite state of magnetization of the surface, the states of magnetization being those of the cells simultaneously under the magnetic heads 15 and 16.

It should be emphasized again that every desired digit in the above code is indicated solely by the number of 1's and 0's in combination in any code and not by the permutations of those binary bits. Thus, the number "3," which is indicated in the above table by the bi-quinary representation 0011—0111 is equally represented by 1100—1101, or by any combination of two binary 1's in the binary portion of the code and three binary 1's in the quinary portion of the code. What this means is that the coded information can be read on each occurrence of the cells under the reading heads or, in other words, as many times during a single rotation of the drum as there are reading heads equally spaced around the periphery of the track of the drum.

It may be noted that the specific bi-quinary code indicated in the above table readily lends itself to self-checking in that the sum of the similar bits in the binary and quinary portions of the code is always odd, and, in the table, the check sum is indicated corresponding to the total number of 1's in the bi-quinary code.

Turning now again to Fig. 2, there is depicted one specific circuit arrangement for reading information in the above-noted code and translating that information to the usual bi-quinary representation; this bi-quinary representation is indicated in Table II.

*Table II*

| Decimal Digit | Bi-Quinary Code | |
|---|---|---|
| | Binary | Quinary |
| 0 | 0 | 0 |
| 1 | 0 | 1 |
| 2 | 0 | 2 |
| 3 | 0 | 3 |
| 4 | 0 | 4 |
| 5 | 5 | 0 |
| 6 | 5 | 1 |
| 7 | 5 | 2 |
| 8 | 5 | 3 |
| 9 | 5 | 4 |

The translator depicted in Fig. 2 comprises a plurality of AND circuits 20, a plurality of inhibit circuits 21, and a plurality of OR circuits 53, which may be of any type known in the art; specific examples of such circuitries are described in the article "Typical Block Diagrams for a Transistor Digital Computer," by J. H. Felker, Transactions of American Institute of Electrical Engineers, vol. 71, part 1, pages 175–182 (1952). Each time during the rotation of the drum 12 that a particular group of equally spaced cells are simultaneously under the heads 15, and similarly simultaneously under the heads 16, the combination of states of magnetizations in those cells is applied to the translator circuit. Specifically, information read out by the heads 15 and relating to the quinary portion of the combinatorial bi-quinary code stored in those cells on the drum, is applied, through the reading amplifiers 17, to leads 23, 24, 25, and 26. These leads are connected to different levels of the translator which is basically a tree arrangement of AND circuits 20 and inhibit circuits 21. A clock pulse is also applied from a clock pulse source 30 over lead 31 to the first level of the translator; source 30 may be another channel on the drum 12 and may also provide the synchronizing pulses for the reading and writing amplifiers 17 and 18, as discussed above.

When a clock pulse is applied over lead 31 to the AND and inhibit circuits 20 and 21 of the first level of the translator, which of the alternative output leads 33 or 34 receives an output pulse will depend on the state of the cell at that moment under the magnetic head 15 associated with lead 23. If a pulse is present on lead 23, the AND gate is enabled and the circuit 21 is inhibited so that the pulse is applied to lead 33 and not lead 34; if no pulse is present on lead 23, AND gate 21 is not enabled, the inhibit circuit is not blocked, and the pulse appears on lead 34. In similar manner each level of the translator operates to provide output pulses on leads 36, 37, 38, 39, and 40 indicative of the codes 0, 1, 2, 3, and 4, respectively, in the quinary portion of the bi-quinary code of Table II. Thus, for example, if a pulse is present on all four of the leads 23 through 26 an output pulse will be applied to lead 40. Similarly, if a pulse is present on any three of the leads 23 through 26 an output pulse will be applied to lead 39, et cetera.

In the same manner the outputs of the heads 16, representing the binary portion of the stored combinatorial code, shown in Table I, are applied, by means of leads 42, 43, 44, and 45 to different levels of the translator circuit. However, as there is no binary zero needed, as can be seen from Table I, only four output leads are provided from the last level of the translator; the leads 48, 49, 50, and 51 indicate, respectively, one, two, three, or four stored bits in the magnetic cells in track 11. Leads 48 and 49 are connected, through an OR circuit 53, to the binary "0" output lead 55 and leads 50 and 51 are similarly connected through an OR circuit 53 to the binary "5" output lead 56. Thus if a pulse is present on any one or any two of the leads 42 through 45, an output pulse will be applied to the binary "0" output lead 55. Similarly if a pulse is present on any three or any four of the leads 42 through 45, an output pulse will be applied to the binary "5" output lead 56.

Information appearing on leads 36, 37, 38, 39, and 40 and leads 55 and 56 is accordingly in the code form of Table II and may be utilized by an output or utilization circuit 58, as desired. Accordingly, information stored on the drum in the purely combinatorial code of Table I can be read out as many times during a single revolution of the drum as there are equally spaced heads around the channels and readily translated into a usual bi-quinary, one-out-of-two and one-out-of-five representation for application to output circuitries. Information may similarly be stored or written into the magnetic cells at any time during the single rotation of the drum as the information may be stored in particular cells in a random manner. Such information may be supplied from an input information source and translator 60.

The combinatorial code, of Table I, as pointed out above, readily lends itself to self-checking. In the embodiment depicted in Fig. 2 this is provided by the inclusion of two AND circuits 62 and 63, the outputs of which are connected together, and by lead 64, to the utilization circuit 58; accordingly, the presence of an output pulse on lead 64 may be employed as an enable signal for the utilization circuit 58. AND circuit 62 has one input connected, through an OR circuit 65, to leads 36, 38, and 40 and the other input connected, through an OR circuit 66, to leads 48 and 50. It will be observed that OR circuit 65 will be actuated when an even number of stored bits (0, 2 or 4) are read by heads 15 in the quinary track 10 on drum 12 and that OR circuit 66 will be actuated when an odd number of stored bits (1 or 3) are read by heads 16 in the binary track 11 on drum 12. As indicated above if the combinatorial code read by heads 15 and 16 is valid, the sum of the bits in the binary and quinary portions thereof is odd. Accordingly, if an even number of quinary bits and an odd number of binary bits are read by heads 15 and 16, respectively, AND gate 62 will be actuated to apply a pulse to lead 64. Similarly, one input of AND circuit 63 is connected, through an OR circuit 67, to leads 37 and 39 and the other input is connected through an OR circuit 68 to leads 49 and 51. The OR circuit 67 will be actuated when an odd number of stored bits (1 or 3) are read by heads 15 in the quinary track 10 on drum 12 and OR circuit 68 will be actuated when an even number of stored bits (2 or 4) are read by heads 16 in the binary track 11 on drum 12. In this case AND gate 63 will be actuated to apply a pulse to lead 64 indicating that a valid code was read.

In the above-described embodiment of my invention access to the stored information may be attained four times during each revolution of the drum; in accordance with other possible embodiments of my invention this access time may be decreased by employing more than four magnetic heads adjacent each track of the drum. However, in these other embodiments different combinatorial codes would have to be employed, as the code of Table I is dependent on two sets of four information bits. In these other codes the number of information bits would have to be equal to the number of magnetic heads adjacent any one track.

Figure 3:
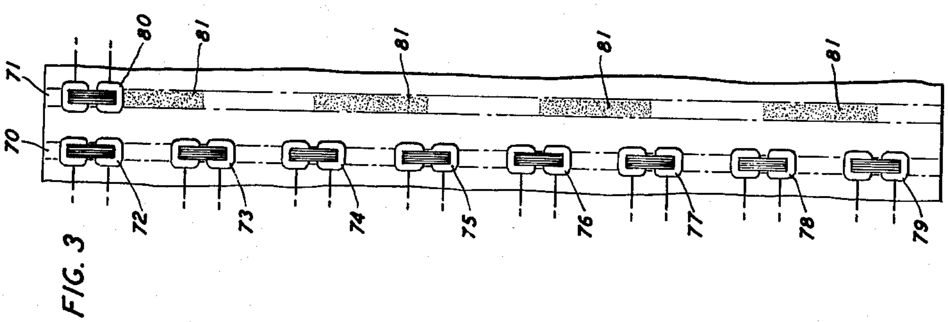
Fig. 3 is a developed view of two tracks of a magnetic drum and is illustrative of another specific embodiment of my invention.

In accordance with other embodiments of my invention, however, shorter access or entry time to the information may be attained while still employing the short code of Table I. Specifically, Fig. 3 is a development section of an information and a gating track of a magnetic drum illustrative of an embodiment wherein access may be had to the information, not four, but eight times during a single rotation of the drum. As seen in the drawing, the information track 70 has equally spaced thereabout eight reading heads 72 through 79, while the gating track 71 has but a single reading head 80 adjacent thereto. The binary and quinary portions of the information code, Table I, are stored in alternate groups of cells on information track 70 so that when heads 72, 74, 76, and 78 are sensing the binary bits of the code, heads 73, 75, 77, and 79 are sensing the quinary bits of the code. When these particular cells are next under the reading heads, one-eighth of a revolution of the drum later, the heads 72, 74, 76, and 78 will be sensing the quinary bits and the heads 73, 75, 77, and 79 the binary bits of the code.

Track 71 provides gating information for commutating the information from each of the heads 72 through 79 to the proper input of a translator circuit, dependent on whether a binary or a quinary bit of the combinatorial code is being read by that particular head. Advantageously, track 71 contains magnetized sections 81 alternately spaced around the track and each being one-eighth circumference long. Thus, the gating head 80 applies an output signal coincident with the binary bits being read by one alternate group of heads adjacent track 70 and no signal when that particular group is sensing the quinary bits. It is, of course, to be understood that such a gating track may advantageously be common to a large number of such double information tracks on a single drum and, in fact, only one such gating track need be provided per drum.

Figure 4:
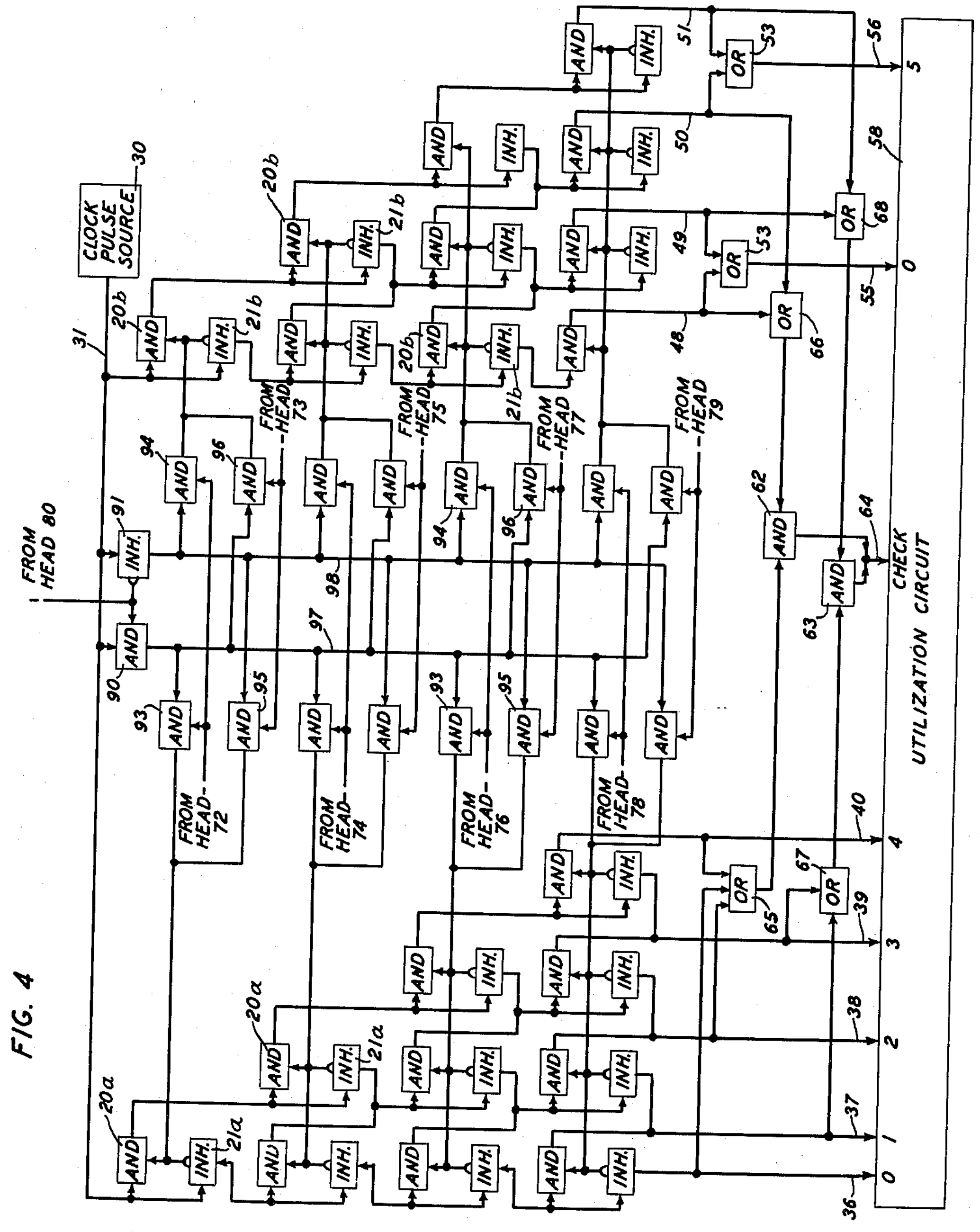
Fig. 4 is a schematic representation of another illustrative embodiment of my invention incorporating the magnetic drum arrangement of Fig. 3.

Fig. 4 depicts an illustrative translator that may be utilized in this specific embodiment. Basically, the translator employs the same tree arrangement of AND and inhibit gates 20 and 21 as the embodiment of Fig. 1 together with four additional AND gates 93, 94, 95 and 96 for each level of the translator. Input signals from the heads are grouped in pairs, corresponding to adjacent heads on the track 70. Thus, inputs from heads 72 and 73, through appropriate reading amplifiers, are applied at the first level of the translator. As these are adjacent heads on the drum, one head will always be reading a binary bit while the other is reading a quinary bit. A clock pulse and a gating pulse, from the gating head 80 adjacent gating track 71, are applied to an AND gate 90 and an inhibit gate 91 so arranged that an output pulse appears on lead 97 if a gating pulse is present and on lead 98 if not present.

Magnetic head 72 is connected to opposite sides of the translator through AND gates 93 and 94, and similarly head 73 is connected to opposite sides of the translator through gates 95 and 96. If a gating pulse is present from head 80, AND gates 93 and 96 are enabled, whereas if no gating pulse is present, AND gates 94 and 95 are enabled. Accordingly, the binary bits of the combinatorial code are always applied to circuits 20*b* and 21*b*, while the quinary bits are always applied to circuits 20*a* and 21*a*. The remainder of the operation of the translator is the same as described above with reference to the embodiment of Fig. 2.

While my invention has been depicted with reference to a specific combinatorial code and with translation from that code to an ordinary bi-quinary code, it is to be understood that other codes could be employed. Thus, the logic circuitry of the utilization circuit could be designed to handle a combinatorial code, so that translation would not be requisite, or the translation provided could be into other types of codes, as into a straight binary code. In any case though, and regardless of the codes involved, access to the stored information is attained a plurality of times during the rotation of the magnetic drum, rather than only a single time as in prior magnetic drum storage systems.

It is to be understood that the above-described arrangements are merely illustrative of the application of the principles of my invention. Numerous other arrangements may be devised by those skilled in the art without departing from the spirit and scope of the invention.

What is claimed is:

1. An electrical circuit comprising a movable surface of magnetizable material, a plurality of magnetic heads located adjacent a single track on said surface, recording means including said heads for simultaneously altering the magnetic state of elemental areas of said surface of said magnetizable material according to a combinatorial code, sensing means including said heads for simultaneously sensing the magnetic state of said elemental areas of said surface adjacent said heads, and logic means for translating the outputs of said sensing means.

2. An electrical circuit in accordance with claim 1 wherein said movable surface comprises a continuously rotating magnetic drum and wherein said heads are equally spaced around the entire periphery of said drum in a single track thereof.

3. An electrical circuit as defined in claim 2 wherein said sensing means are divided into two groups in combination with commutating means alternately determining the application of the outputs of said two groups of sensing means to said logic means.

4. An electrical circuit in accordance with claim 3 wherein said commutating means comprises another track on said magnetic drum and a single magnetic head adjacent thereto, the magnetic state of the surface in said other track of said drum being constant for a distance equal to the spacing between adjacent of said magnetic heads and alternating around said other track.

5. An electrical circuit comprising a movable surface of magnetizable material, a plurality of tracks on said surface, a corresponding plurality of groups of magnetic heads, each of said groups of heads located adjacent a respective one of said tracks, means including said groups of heads for recording information in elemental areas in each of said tracks according to a combinatorial code, means including said groups of heads for simultaneously determining the magnetic state of said elemental areas of said surface adjacent said groups of heads at any given instant and logic means for translating the combinatorial code outputs of said determining means.

6. An electrical circuit as defined in claim 5 wherein said movable surface comprises a continuously rotating magnetic drum and wherein each of said groups of heads are equally spaced around the periphery of said drum in an individual track thereof.

7. An electrical circuit as defined in claim 6 in combination with check means controlled by said logic means for checking the plausibility of the translation of said outputs of said determining means.

8. An electrical circuit comprising a magnetic drum, a first plurality of magnetic heads equally spaced around the periphery of said drum in a first track thereof, a second plurality of magnetic heads equally spaced around the periphery of said drum in a second track thereof, means including said first and said second plurality of heads for simultaneously altering the magnetic state of elemental areas of the surface of said drum according to a combinatorial code, sensing means including said first and said second plurality of heads for simultaneously sensing the magnetic state of said elemental areas of said surface of said drum under said heads at any given instant and logic means for translating the outputs of said sensing means.

9. A magnetic drum, a plurality of magnetic heads equally positioned around a single track on said drum, means including said heads for simultaneously similarly magnetizing a plurality of cells in said track to record information therein according to a combinatorial code, means including said heads for simultaneously sensing the states of said cells, and output means connected to said sensing means whereby said information may be applied to said output means during each rotation of said drum a number of times equal to the number of said plurality of magnetic heads.

10. In an electrical circuit comprising a magnetic drum, a plurality of elemental information cells arranged in ordered tracks and slots on said drum, a group of *n* magnetic heads positioned around a single track on said drum, a group of *m* magnetic heads also positioned around a single track on said drum, means including said *m* and *n* magnetic heads for changing the state of magnetization of the cells simultaneously under said heads to store information on said drum in accordance with a combinatorial code, means including said heads for simultaneously sensing the state of said cells under said heads, output means, and translating means connected to said sensing means and said output means for applying to said output means signals dependent on the number of similarly magnetized cells simultaneously under said *m* and under said *n* heads.

11. An electrical circuit in accordance with claim 10 wherein said *n* magnetic heads are positioned around a first track on said drum and said *m* magnetic heads are positioned around a second track on said drum.

12. An electrical circuit in accordance with claim 10 wherein said *m* and *n* magnetic heads are all equally spaced and alternately positioned around the same track on said drum.

13. An electrical circuit in accordance with claim 12 wherein said translating means includes first logic means to which information corresponding to a first code is applied, and second logic means to which information corresponding to a second code is applied, and further comprising commutating means for alternately connecting said *m* and said *n* heads to said first and second logic means.

14. An electrical circuit comprising a data storage medium having a plurality of elemental areas each adapted to store one information bit, a plurality of pickup and recording devices adjacent said medium and each adapted to read the individual elemental areas thereof, means including said plurality of pickup and recording devices for similarly magnetizing certain ones of said plurality of elemental areas to store information in said medium in accordance with a combinatorial code, means providing relative motion between said medium and said devices whereby a given elemental area of said medium is successively read by each of said devices, means including said devices for simultaneously reading the elemental areas of said medium adjacent said pickup devices at any given instant, and means for translating the information bits simultaneously read by said devices.

References Cited in the file of this patent

UNITED STATES PATENTS

| | | |
|---|---|---|
| 2,680,239 | Daniels et al. | June 1, 1954 |
| 2,836,359 | Mazzagatti | May 27, 1958 |
| 2,850,726 | Steele | Sept. 2, 1958 |
| 2,866,179 | Haanstra | Dec. 23, 1958 |

FOREIGN PATENTS

| | | |
|---|---|---|
| 745,614 | Great Britain | Feb. 29, 1956 |